Aug. 27, 1940.  E. J. FRASER  2,212,708
COUPLING DEVICE
Filed July 2, 1936  3 Sheets-Sheet 1

Inventor
Edwin J. Fraser
by Rummler Rummler & Woodworth
Attys.

Aug. 27, 1940.  E. J. FRASER  2,212,708
COUPLING DEVICE
Filed July 2, 1936  3 Sheets-Sheet 3

Inventor
Edwin J. Fraser
by Rummler Rummler & Woodworth
Attys.

Patented Aug. 27, 1940

2,212,708

UNITED STATES PATENT OFFICE 2,212,708

COUPLING DEVICE

Edwin J. Fraser, Riverside, Ill., assignor to Keeshin Motor Express Co., Inc., Chicago, Ill., a corporation of Illinois Application July 2, 1936, Serial No. 88,606

3 Claims. (Cl. 280—33.1)

This invention relates to improvements in fifth wheel constructions employed in connection with vehicle tractors and trailers and more particularly to automatic devices for coupling transport tractors to transport trailers or semitrailers.

The main objects of the present invention are to provide an improved fifth wheel coupling construction; to provide a motor transport coupler which automatically interlocks a tractor to a trailer or vice versa when the two are in proper contact; to provide a coupler which is capable at all times of free pivotal movement in a horizontal plane; to provide automatic locking means for positively interlocking the trailer and tractor; to provide automatically actuated pivotal coupler arms arranged to receive and embracingly engage a king pin; and to provide such a coupling means that will remain constantly in proper working position for automatic coupling operations.

An illustrative embodiment of this invention is shown in the accompanying drawings in which:

Fig. 5 is a cross sectional view taken on the line 5—5 of Fig. 2.

Fig. 6 is a perspective view of one of the keeper arms shown detached from the coupling mechanism.

In vehicle units of this character the trailer is supported at its front end on a tractor for movement therewith as a complete unit and is supported on temporary load supports when detached from the tractor.

Figure 1:
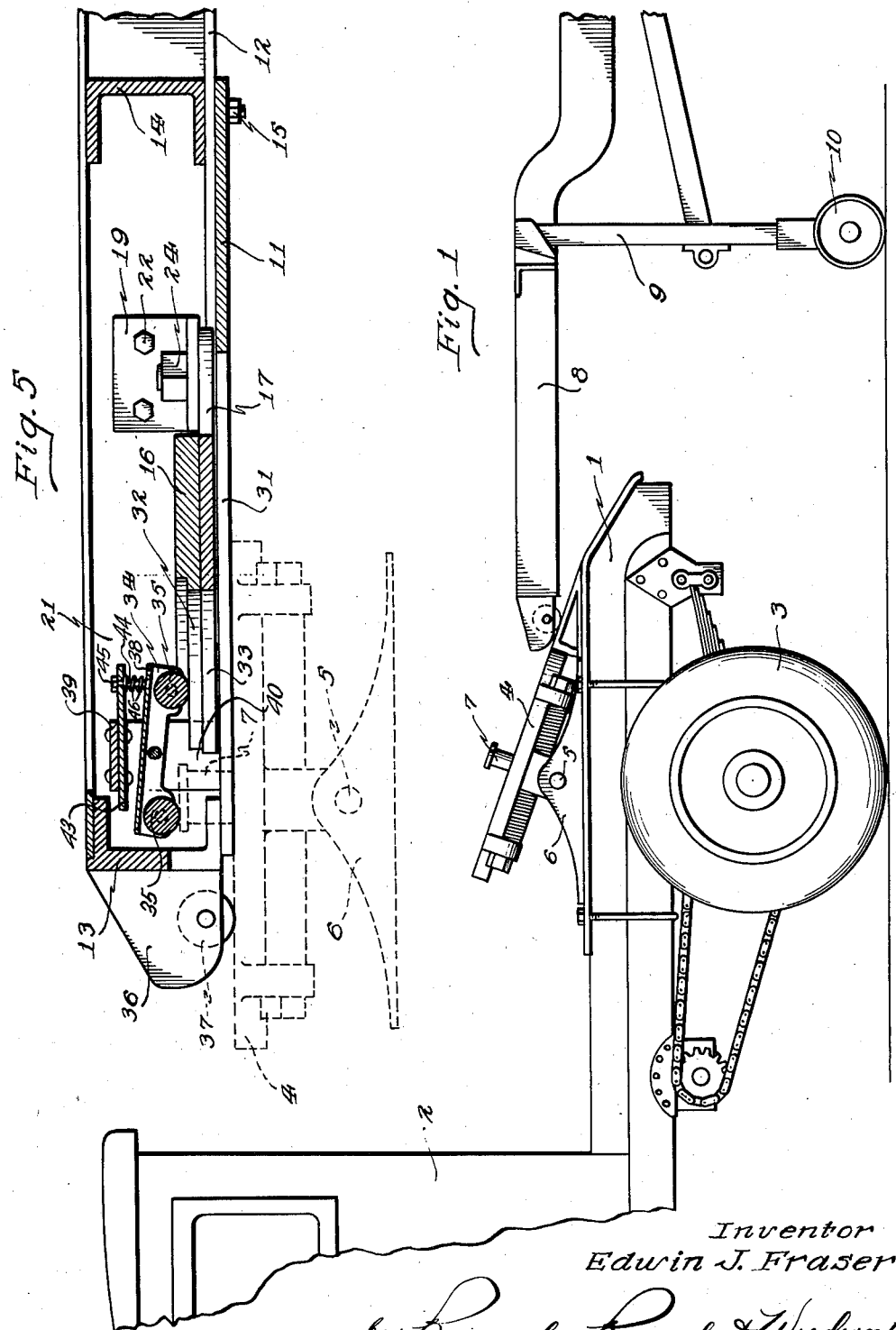
Fig. 1 is a side view of a tractor and trailer chassis, with parts broken away.
Figure 2:
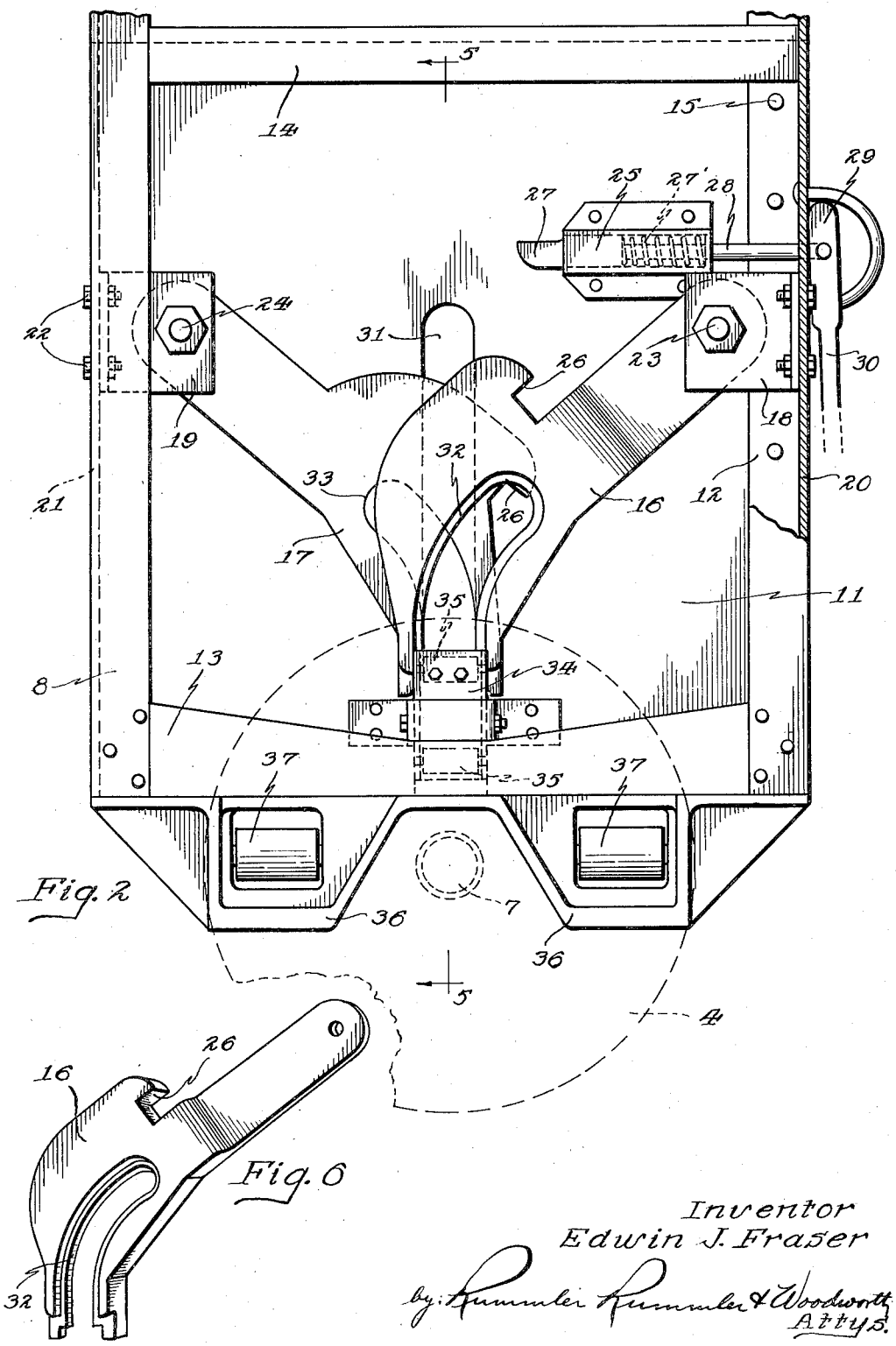
Fig. 2 is a top plan view of an upper fifth wheel coupler construction in uncoupled or inoperative position; a lower fifth wheel construction being shown in plan and in dotted outline.

The tractor shown in Fig. 1 of the drawings is of the conventional type and comprises a chassis or frame 1, a cab 2, motor, and front or steering wheels, not shown, rear or drive wheels 3 which are connected through the usual mechanism and gears for driving the tractor, and a lower fifth wheel table member 4 which is rockably mounted on a transverse horizontally extending shaft 5 journaled in bearing 6 secured on the chassis 1, to permit the lower fifth wheel member to be tilted fore and aft. The lower fifth wheel member normally assumes the definite rearward tilted position shown in Fig. 1 to facilitate the coupling operation.

The fifth wheel member 4 is preferably a circular casting of substantial thickness and is provided with an aperture in its center of sufficient diameter to receive the headed king-pin, bolt or post 7.

For convenience in illustrating the present invention, the body of the trailer has not been shown and when reference is made herein to a trailer, it is intended to include the body thereof as well as all the component parts of the vehicle which make up a transport trailer or semi-trailer.

The trailer or semi-trailer comprises the usual chassis frame 8, under-carriage 9, which carries the auxiliary front supporting wheels 10, and rear road wheels, not shown.

Figure 4:
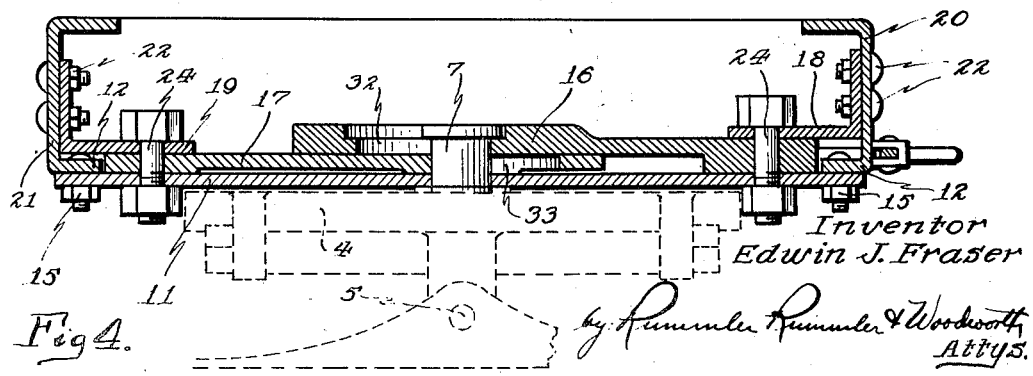
Fig. 4 is a cross sectional view taken on the line 4—4 of Fig. 3.

The fifth wheel member, to which this invention is directed, comprises a bottom plate 11 which is securely anchored to the lower inwardly-extending legs 12 of the side channels forming part of the chassis frame 8 and to the chassis frame cross members 13 and 14 by any suitable means, such as bolts 15; and a pair of forked arms or keepers 16 and 17, each pivotally secured to angle plates 18 and 19 which in turn are secured to the sidewalls 20 and 21 respectively of the said side channels by any suitable means, such as bolts 22, see Fig. 4.

Pivot pins 23 and 24, preferably large bolts, extend through apertures in the horizontal legs of the angle plates 18 and 19 and through apertures in the bottom plate 11.

Figure 3:
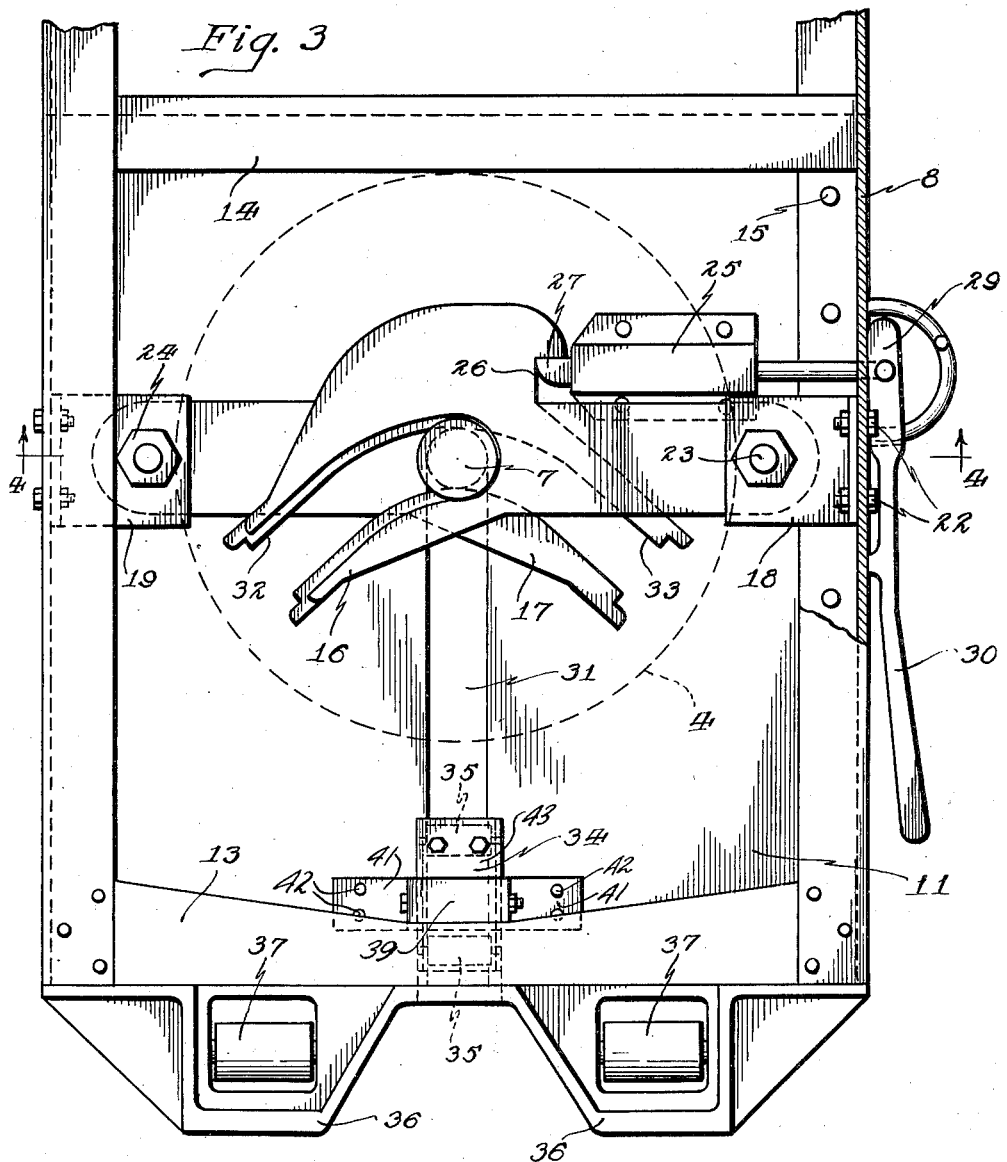
Fig. 3 is a top plan view of an upper fifth wheel coupler construction in coupled or operative position.

When the keepers 16 and 17 are in the closed or operative position shown in Fig. 3, the latch lock 25 engages the catches 26—26 provided in each of the keepers and which are so arranged that they register with each other simultaneously. A compression spring 27' mounted in a casing containing the latch bolt 27 constantly urges the latch bolt outwardly so that the latch bolt shoots home in the catch and prevents forward movement of the keepers when the catches of each of the keepers arms are in registry. The latch bolt 27 is provided with a rearwardly extending arm 28 which is journaled in the forked end 29 of a handle 30. When the handle is moved outwardly the open end of the fork 29 acts as a cam and travels in a straight line parallel with and at all times contacting the chassis frame 8, drawing the latch bolt 27 into the casing and out of the catches 26—26 to permit forward movement of the arms 16 and 17 and to uncouple the tractor from the trailer.

The plate 11 is provided with a guideway or slot 31 which extends rearwardly to a point in line with the pivot bolts 23 and 24. The slot 31 is slightly wider than the diameter of the king-pin 7 to readily receive the same.

Each of the arms or keepers 16 and 17 are provided with arcuate cam slots 32 and 33 of sufficient width to receive the king-pin 7.

A rocking lock mechanism 34 is mounted on the forward end of the trailer over the guideway 31, in a manner shown in Figs. 3 and 5 of the drawings. This mechanism comprises a pair of rollers 35—35 mounted in and crosswise of a channel bar 38, near the ends thereof. This bar 38 is centrally pivoted within and to the inverted U-bridge portion 39 of the strap iron 40 over the guide slot 31, for vertical tilting. The strap iron 40 is provided with anchoring end flanges 41—41 for securing the strap iron to the bottom plate 11 in any suitable manner, as by rivets 42. The middle portion of the strap iron bridges the guideway 31 so that said rocking lock mechanism is located directly over said guideway as will be apparent. A plate 43 is secured to the under side of the bridge portion 39 and longitudinal with the guide slot 31, as shown in Fig. 5. A pin 44 is secured at its lower end to the rear end of the channel iron 38 and the other end extends through the apertured plate 43 and provided with a stop nut 45. The pin 44 serves as a guide for the compression spring 46. The spring 46 normally tends to urge the rearward roller downwardly at all times so that the roller 35 will normally be positioned in the cam slots 32 and 33 to retain the keeper arms 16 and 17 in a symmetrical position relative to the slotted guideway 31 when the keeper arms are in inoperative or uncoupled position.

In operation the tractor is backed up to the trailer in such a manner that the king-pin of the lower fifth wheel mechanism is positioned somewhere between the protruding V-jaws 36—36 to guide it into the guideway of the bottom plate. The antifriction rollers 37—37 contact the table top of the lower fifth wheel mechanism and tend to ease the lifting movement of the forward part of the trailer. When the king-pin enters the guideway in the bottom plate, the table of the lower fifth wheel mechanism will automatically shift to a horizontal plane.

By rearward movement of the tractor, the king-pin enters the cam slots of the keeper arms and upon further rearward movement, the keeper arms will interlockingly and embracingly engage the king-pin. When the king-pin has traveled the length of the cam slot, the keeper arms will be locked in final position by the locking means which prevent the arms from opening or moving in a forward direction. The vehicles are now coupled in position and are ready for movement as one unit. To uncouple the tractor from the trailer, the handle of the lock is shifted manually to disengage the latch bolt and the tractor then moves forwardly and the two units are uncoupled.

It will be understood that the hereindescribed coupler mechanism may be mounted on either the tractor or the trailer depending upon which unit carries the king-pin, and that in either case the operation and function of the component parts will be substantially the same.

Although but one specific embodiment of this invention is herein shown and described, it is to be understood that details as set forth may be altered or omitted without departing from the spirit of the invention as defined by the following claims:

I claim:

1. A vehicle having a fifth wheel mechanism including a king-pin, in combination with a second vehicle having a complementary fifth wheel mechanism comprising a bottom plate provided with a guideway, and a pair of arms disposed above said plate, one end of each of said arms being provided with an arcuate slot providing a cam face, and the opposite ends of said arms being pivotally secured to said plate adjacent the side edge thereof, said guide being arranged to receive said king-pin and direct the same into engagement with each of said cam faces simultaneously whereby said arms are shifted into interlocking engagement with said king-pin, and automatic locking means acting on and preventing shifting of said arms when they are interlocked with said king-pin.

2. A vehicle fifth wheel mechanism including a king-pin, a second vehicle having a complementary fifth wheel mechanism comprising an elongated traction arm having a portion of one end thereof forked and having its other end secured adjacent the side frame of the vehicle to permit movement of the arm, the traction arm having a catch structure substantially intermediate its ends, a latching mechanism positioned substantially parallel with and adjacent the said intermediate portion of the arm and extending throughout a substantial portion of the latter's length, whereby when the king-pin is in operative position and the arm has been thereby moved the latching mechanism will engage the catch structure in a laterally offset position with respect to the king-pin.

3. A vehicle fifth wheel mechanism including a king-pin, a second vehicle having a complementary fifth wheel mechanism comprising an elongated traction arm having a portion of one end thereof forked and having its other end secured adjacent the side frame of the vehicle to permit movement of the arm, the traction arm having a catch structure between the inner end of the forked end portion and the point of securing the arm, a latching mechanism positioned parallel with and adjacent the said intermediate portion of the arm and extending throughout a substantial portion of the latter's length, whereby when the king-pin is in operative position and the arm has been thereby moved the latching mechanism will engage the catch structure in a laterally offset position with respect to the king-pin and the point of securing of the arm.

EDWIN J. FRASER.